Patented May 27, 1952

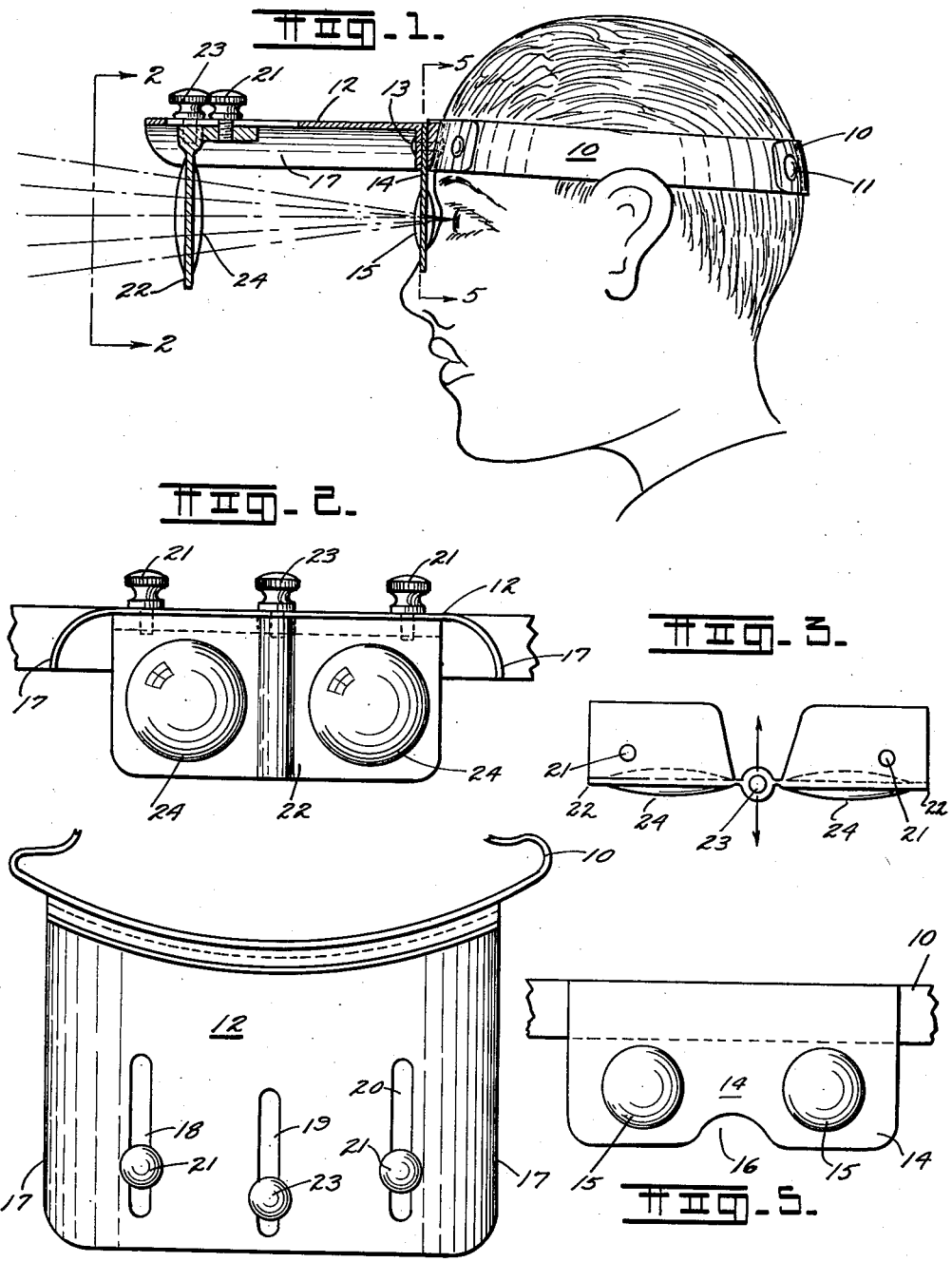

2,598,145

UNITED STATES PATENT OFFICE 2,598,145

COMBINATION VISOR AND MAGNIFIER

Earl G. Steadman, Jr., Youngstown, Ohio

Application December 5, 1950, Serial No. 199,190

6 Claims. (Cl. 88—39)

This invention relates to magnifiers in general and relates particularly to a novel structural combination of a head support visor and adjustable magnifier.

The principal object of the invention is the provision of a combination visor and magnifier formed of lightweight material such as plastic and adapted to be worn by a person desiring to obtain a close-up view of an activity such as a sports event or the like.

A further object of the invention is the provision of a combination visor and magnifier incorporating a pair of depending magnifier lenses formed as generally rectangular sections of transparent plastic material having relatively large lens areas integrally formed therein.

A still further object of the invention is the provision of a head supported magnifier so arranged as to provide the wearer with a relatively large magnified field of view.

A still further object of the invention is the provision of a head supported magnifier, the lens portions of which are adjustable with respect to one another and one of the said lens portions being capable of being warped to enable the focal plane of the device to be adjusted to the desired field of view.

The combination visor and magnifier disclosed herein comprises a relatively simple and inexpensive construction formed of inexpensive lightweight materials such as molded plastic material and comprises essentially a pair of spaced rectangular lenses formed of transparent plastic and having spaced individual lens areas integrally formed therewith. Both of the lens sections are mounted on a visor offering light protection to the wearer and providing means for adjusting the position of the one lens with respect to the other so that the device may be properly focused with respect to a given distance and field of view. The device is therefore capable of being manufactured at low cost and distributed widely at various sports events such as football games and the like.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is a side view with parts in cross section illustrating the combination visor and magnifier in position on the head of a wearer.

Figure 2 is a front view of the device shown in Figure 1.

Figure 3 is a top plan view of one of the lenses shown in Figure 1. Arrows indicate the manner in which the lens may be warped to adjust the focal length of the magnifier.

Figure 4 is a top plan view of the device shown in Figure 1.

Figure 5 is a vertical section taken on line 5—5 of Figure 1.

By referring to the drawings and Figure 1 in particular it will be seen that the combination visor and magnifier includes a headband 10 which may obviously be adjustably positioned about the head of a wearer and secured in position as by fasteners 11. A horizontally positioned, forwardly projecting visor 12 is secured to the headband 10 as by rivets 13. A generally rectangular plate 14 is positioned in spaced relation to the headband 10 so that it is properly positioned in front of the face of the wearer and particularly with respect to the eyes of the wearer. The generally rectangular plate 14 is shown in front plan view in Figure 5 of the drawings and it will be observed that it includes a pair of relatively large double convex lens areas 15—15 spaced with respect to one another and adapted to be positioned in front of the wearer's eyes. The generally rectangular plate 14 is also provided with a cutout section 16 forming clearance for the wearer's nose.

By referring to Figures 1 and 2 of the drawings it will be seen that the visor 12 has downturned edge portions 17—17 and that the body of the visor 12 is positioned at a slight angle with respect to the headband 10 so that it is in a normally horizontal position projecting in front of and above the eyes of the wearer.

By referring to Figures 1, 2 and 4 of the drawings it will be seen that the visor 12 is provided with three longitudinally extending transversely spaced slots 18, 19 and 20. The slots 18 and 20 which may be referred to as tracks have thumbscrews 21—21 positioned therethrough which are engaged in a flanged upper edge of a generally rectangular flexible secondary plate 22 thereby positioning the same in depending relation to the visor 12 and spaced forwardly with respect to the plate 14. The slot 19 in the visor 12 positions a secondary thumbscrew 23 which engages the flanged upper edge of the secondary plate 22 midway between the ends thereof as best shown in Figure 3 of the drawings.

The relative positionings of the thumbscrews 21—21 and 23 in the slots or tracks 18, 19 and 20 are shown in Figure 4 of the drawings and it will be observed that by moving the thumbscrew 23 forwardly or backwardly in the slot 19, the secondary plate 22 will be warped or bent on its central vertical axis thereby enabling the focal length of the magnifier to be correctly adjusted. Arrows in Figure 3 of the drawings indicate this adjustment.

It will occur to those skilled in the art that the device thus provides two adjustments making it possible for the wearer to adjust the device to obtain a desirably magnified view of a relatively large field of view at a particular distance. These adjustments comprise the loosening of the thumbscrews 21 and 23 and moving the secondary plate forwardly or backwardly in the slots 18, 19 and 20 of the visor 12 until the desired magnification and field of view are achieved. The focusing of the device by adjusting the focal plane thereof is then achieved by loosening the thumbscrew 23 and warping or bending the plate 22 between the lenses 24 therein sufficiently to properly adjust the focal plane of the magnifier. The construction disclosed thus enables a simple, inexpensive, lightweight device to be adjusted perfectly to the particular field of view and distance of the wearer therefrom. Those skilled in the art will recognize that the formation of the plates 14 and 22 as molded plastic pieces enables the same to incorporate the transversely spaced relatively large double convex lens areas. These are indicated by the numerals 15 and 24 which indicate the lens areas on the plates 14 and 22, respectively.

It will thus be seen that the device comprises the headband 10, the forwardly extending visor 12, the generally rectangular plate 14 positioned adjacent the eyes of the wearer and secured to the visor 12, and the secondary plates 22 which is also generally rectangular and larger in area than the plates 14 and which is an inverted L shape in vertical section thereby enabling it to be adjustably positioned on the visor 12 by means of thumbscrews 21 and 23.

It will also occur to those skilled in the art that if desired the plates 14 and 22 may be hinged with respect to the visor 12 so that they can be swung upwardly out of the way, or alternately, the visor 12 and the plates 14 and 22 may be hinged transversely with respect to the headband 10 thereby enabling the entire device to be moved vertically with respect to the wearer's face and eyes.

It will thus be seen that the several objects of the invention have been met by the combination visor and magnifier disclosed herein.

Having thus described my invention, what I claim is:

1. A headband, a visor mounted horizontally across the front portion of said headband and projecting forwardly from the headband and being flat for substantially its entire width, a rectangular rear plate of transparent material mounted in stationary position along the rear edge of said visor and depending therefrom and having portions formed with lenses spaced from margins of the plate and from each other transversely of the plate and disposed in position for registry with a person's eyes, said lenses having convexed front and rear surfaces, a rectangular front plate of flexible transparent material extending across the forward portion of said visor in depending relation thereto and in forwardly spaced relation to the rear plate and having portions formed with lenses spaced from margins of the plate and from each other transversely of the plate and disposed in front of the rear lenses in cooperating relation thereto, the lenses of the front plate having convexed front and rear surfaces, and fastener members spaced from each other transversely of the front plate and the visor and releasably connecting the upper edge portion of the front plate with said visor said fastener members mounting the front plate for sliding movement forwardly and rearwardly along the visor to adjusted positions forwardly of the rear plate, and one of said fasteners being intermediate the width of the front plate and the others spaced from opposite sides thereof, said fasteners being independently movable longitudinally of the visor to adjusted positions whereby end portions of the flexible front plate may be moved to angularly adjusted positions and firmly secured.

2. A headband, a visor mounted horizontally across the front portion of said headband and projecting forwardly therefrom, a transparent rear plate mounted vertically in a stationary position across the rear end portion of said visor and extending downwardly therefrom near the headband, said rear plate having lenses formed therein in spaced relation to margins thereof, said lenses being spaced from each other transversely of the plate and disposed in position for registry with eyes of a wearer, a flexible transparent front plate extending across the visor in depending relation thereto and having lenses therein, the lenses of the front plate being spaced from margins of the said front plate and spaced from each other transversely thereof and disposed in front of the lenses of the rear plate in cooperating relation thereto, said visor being formed intermediate its width with a longitudinally extending central slot and side slots spaced from the central slot transversely of the visor, and adjustable fasteners passing vertically through the slots and engaged with the upper portion of the front plate and slidably mounting the front plate for movement longitudinally of the slots to adjusted positions disposing end portions of the front plate in angularly adjusted positions relative to each other and to the rear plate, and said fasteners engaging the upper surface of the visor and independently tightened to releasably secure the front plate in angularly adjusted positions.

3. A headband, a visor mounted along the front portion of said headband and projecting forwardly therefrom, a vertically disposed depending transparent plate mounted across the rear end of said visor and having integrally formed lens areas spaced from margins of the plate and spaced from each other transversely thereof and disposed in position for registry with a person's eyes, a secondary vertically disposed transversely extending plate of flexible transparent material formed with transversely spaced integral lens areas spaced from each other transversely of the plate and disposed in optical alignment with the lens areas of the first plate, said visor being provided with a center track and with side tracks extending longitudinally of the visor and spaced transversely from the center track, the second plate being shiftable forwardly and rearwardly along the tracks of said visor in spaced relation to the first plate and releasably held to the visor by fasteners carried by the said second plate and independently movable forwardly and rearwardly along the tracks to adjusted positions, one of said fasteners being positioned midway the width of the second plate and connected therewith between the lens areas thereof and the other fasteners being spaced from opposite sides of the first fastener transversely of the said second plate and independently movable along the companion tracks of the visor whereby portions of the second plate between the first fastener and its ends may be bent longitudinally of the visor about the first fastener and its lens areas disposed diagonally and laterally with respect to the line of sight and the angle of convergence between the lens areas of the first and second plates thereby controlled.

4. A headband, a horizontal visor mounted along the front portion of said headband and projecting forwardly therefrom and having its forward portion formed with a longitudinal slot midway its width and with secondary longitudinally extending slots spaced from opposite sides of the first slot and also spaced from side edges of the visor, a pair of rectangular plates disposed vertically under said visor transversely thereof and each having magnifying lens areas spaced from margins of the plate and laterally from each other, one plate being a rear plate rigidly mounted across the visor and the other being a front plate spaced forwardly from the rear plate and disposed in crossing relation to the slots, the front plate being flexible and formed midway its width with a vertical socket leading from its upper edge and registering with the center slot of the visor, a thumb screw passed downwardly through the center slot and into said socket, flanges extending rearwardly from the upper edge of the front plate and formed with threaded openings registering with the secondary slots in the visor, said flanges having inner ends terminating in spaced relation to opposite sides of the center socket whereby the front plate may be flexed longitudinally of the visor and its lenses disposed diagonally in optical alignment with the lenses of the rear plate and the angle of convergence between the lenses of the front and rear plates controlled, and thumb screws passed downwardly through the secondary slots and engaged in the threaded openings under the secondary slots and tightened to grip the visor and releasably hold the front plate in angularly adjusted positions.

5. In a combination visor and magnifier, a forwardly projecting member constituting a visor, a vertically positioned transversely extending depending plate positioned at the rear end of said visor, said plate having spaced integrally formed lens areas for registry with a wearer's eyes, a second vertically disposed transversely extending plate of flexible material formed with transversely spaced lens areas in optical alignment with the lenses of the first plate, the second plate being adjustably positioned on the said visor in spaced relation to the first plate by means of releasable fasteners movably engaged with the said visor for forward and rearward movement to adjusted positions in which they are firmly held, one of the said fasteners being located on the vertical axis of the second plate between the lenses thereof and the other ones of the fasteners spaced sidewardly with respect thereto whereby the second plate may be bent on its vertical axis to adjust the angle of convergence between the first and second lenses.

6. A visor and magnifier comprising a horizontally positioned body member constituting a visor and having three longitudinally extending transversely spaced slots therein, one of which slots is on the center line of the visor and the other slots being spaced from opposite sides of the center slot, a pair of plates depending from said visor transversely thereof and one being disposed in forwardly spaced relation from the other, both of said plates having lens areas formed therein spaced from each other transversely of the plates, one plate being positioned on the visor beneath the said slots and formed of flexible material, thumb screws passing through the slots and engaged with the front plate whereby the said front plate may be moved forwardly and rearwardly on the visor with respect to the rear plate and whereby the front plate may be warped on its vertical axis to adjust the angle of convergence between the lenses of the two plates.

EARL G. STEADMAN, Jr.

REFERENCES CITED

The following references are of record in the file of this patent:

UNITED STATES PATENTS

| Number | Name | Date |
|---|---|---|
| 716,258 | Maass | Dec. 16, 1902 |
| 945,078 | Beebe | Jan. 4, 1910 |
| 1,562,046 | Perrin | Nov. 17, 1925 |
| 2,445,355 | Hurt | July 20, 1948 |

FOREIGN PATENTS

| Number | Country | Date |
|---|---|---|
| 260,352 | Switzerland | July 16, 1949 |